US012680898B2

(12) United States Patent
Tian et al.

(10) Patent No.: US 12,680,898 B2
(45) Date of Patent: Jul. 14, 2026

(54) AMBIENT PRESSURE COMPENSATION STRUCTURE AND METHOD FOR ULTRAVIOLET DIFFERENCE SPECTRUM GAS SENSOR

(71) Applicants:CCTEG SHENYANG RESEARCH INSTITUTE, Shenyang (CN); CHINA COAL RESEARCH INSTITUTE, Beijing (CN)

(72) Inventors: Fuchao Tian, Shenyang (CN); Yuntao Liang, Shenyang (CN); Shuanglin Song, Shenyang (CN); Xing Al, Shenyang (CN); Yazhou Xu, Shenyang (CN); Weiwei Su, Shenyang (CN); Baolong Guo, Shenyang (CN); Zhenrong Li, Shenyang (CN)

(73) Assignees: CCTEG SHENYANG RESEARCH INSTITUTE, Shenyang (CN); CHINA COAL RESEARCH INSTITUTE, Beijing (CN)

( * ) Notice: Subject to any disclaimer, the term of this patent is extended or adjusted under 35 U.S.C. 154(b) by 337 days.

(21) Appl. No.: 18/544,658

(22) Filed: Dec. 19, 2023

(65) Prior Publication Data

US 2024/0118157 A1 Apr. 11, 2024

Related U.S. Application Data

(63) Continuation of application No. PCT/CN2022/137953, filed on Dec. 9, 2022.

(30) Foreign Application Priority Data

Jul. 29, 2022 (CN) .......................... 202210903306.2

(51) Int. Cl.
*G01L 19/00* (2006.01)
*G01N 21/01* (2006.01)
*G01N 21/33* (2006.01)

(52) U.S. Cl.
CPC .......... *G01L 19/0092* (2013.01); *G01N 21/01* (2013.01); *G01N 21/33* (2013.01); *Y02A 50/20* (2018.01)

(58) Field of Classification Search
CPC .. G01N 21/33; G01N 21/01; G01N 2201/023; G01N 2201/0231; G01L 19/0092; Y02A 50/20
See application file for complete search history.

(56) References Cited

U.S. PATENT DOCUMENTS

2003/0020888 A1* 1/2003 Tanaka ................ G03F 7/70058
355/53
2010/0027012 A1* 2/2010 Fritz .................. G01N 21/1702
356/432

(Continued)

FOREIGN PATENT DOCUMENTS

CN 104142299 A 11/2014
CN 107101906 A 8/2017

(Continued)

OTHER PUBLICATIONS

International Search Report and Written Opinion issued in International Application No. PCT/CN2022/137953; mailed Apr. 24, 2023; 13 pages.

(Continued)

*Primary Examiner* — Helen C Kwok
(74) *Attorney, Agent, or Firm* — HAUPTMAN HAM, LLP

(57) ABSTRACT

An ambient pressure compensation structure for an ultraviolet difference spectrum gas sensor includes a closed box, an ultraviolet difference spectrum gas sensor, a digital pressure sensor, a thermostatic controller, an industrial control computer, a pressure regulating assembly and a limiting partition; the pressure regulating assembly and the limiting partition are arranged inside the closed box, the pressure regulating assembly comprises a piston, a regulating rod and a driving motor, the left side of the piston is connected with the regulating rod, the front end of the regulating rod penetrates out of the closed box and is connected with the driving motor, and the piston divides the interior of the closed box into a pressure regulating air chamber and a working air chamber. Also disclosed is an ambient pressure compensation method for an ultraviolet difference spectrum gas sensor.

8 Claims, 2 Drawing Sheets

(56)         References Cited

U.S. PATENT DOCUMENTS

2016/0245830 A1 *   8/2016   Mace ................... A61B 5/0816
2018/0356383 A1 * 12/2018   Phelipot ............. G01N 33/0075

FOREIGN PATENT DOCUMENTS

| CN | 209541993 | U | 10/2019 |
| CN | 112113927 | A | 12/2020 |
| CN | 112666109 | A | 4/2021 |
| CN | 115128027 | A | 9/2022 |

OTHER PUBLICATIONS

First Office Action and Search Report issued in Chinese Application No. 202210903306.2; mailed Apr. 27, 2023; 21 pages.
Second Office Action and Search Report issued in Chinese Application No. 202210903306.2; mailed Jun. 21, 2023; 17 pages.
Chen, Yeanming, Research on Non-dispersive Infrared SF6, Gas Sensor and AirPressure Compensation Method; Chinese Master's theses Full-text Database Information Science and Technology, vol. 01, Jan. 15, 2019, 72 pages (English Abstract).

* cited by examiner

AMBIENT PRESSURE COMPENSATION STRUCTURE AND METHOD FOR ULTRAVIOLET DIFFERENCE SPECTRUM GAS SENSOR

RELATED APPLICATIONS

The present application is a Continuation of International Application Number PCT/CN2022/137953 filed Dec. 9, 2022, which claims priority to Chinese Application Number 202210903306.2 filed Jul. 29, 2022, the disclosure of which is hereby incorporated by reference herein in its entirety.

TECHNICAL FIELD

The present invention relates to the technical field of gas detection, in particular to an ambient pressure compensation structure and method for an ultraviolet difference spectrum gas sensor.

BACKGROUND

As a fast and accurate gas quantitative analysis technology, gas analyzers based on ultraviolet difference spectrum gas sensor technology are widely used especially in coal mine underground gas detection, continuous emission monitoring and motor vehicle tail gas detection. However, the traditional spectrum analyzers are susceptible to ambient pressure when detecting the concentration of gas, and it is difficult to eliminate the influence of hardware fluctuation and system drift on the quantitative analysis of gas concentration. In addition, when the ambient pressure changes, the gas in unit volume changes, that is, the molecular spacing of the gas changes, so that the energy absorbed by ultraviolet rays changes, but the concentration of the gas to be detected does not change. Therefore, the test concentration has a large deviation from the true value, and pressure calibration needs to be performed on the sensor when there is often a large range of change in pressure at the same site or a large change in pressure at the calibration site and the use site of the sensor. In the prior art, there is no pressure compensation structure and method for an ultraviolet difference spectrum gas sensor.

SUMMARY

In order to solve the above technical problems, an object of the present invention is to provide an ambient pressure compensation structure and method for an ultraviolet difference spectrum gas sensor.

In order to achieve the above object, the present invention provides the following technical solutions:

an ambient pressure compensation structure for an ultraviolet difference spectrum gas sensor comprises a closed box, an ultraviolet difference spectrum gas sensor, a digital pressure sensor, a thermostatic controller, an industrial control computer, a pressure regulating assembly and a limiting partition; wherein the closed box is of a cuboid structure, the pressure regulating assembly and the limiting partition are arranged inside the closed box, the pressure regulating assembly comprises a piston, a regulating rod and a driving motor, the left side of the piston is connected with the regulating rod, the front end of the regulating rod penetrates out of the closed box and is connected with the driving motor, the piston divides the interior of the closed box into a pressure regulating air chamber and a working air chamber, the piston is hermetically and slidably connected with the inner wall surface of the closed box, and is arranged on the left side of the limiting partition, the limiting partition is used for limiting the displacement of the piston, the upper side of the working air chamber is provided with an inlet for gas to be detected, and the right end of the working air chamber is provided with an outlet for gas to be detected;

the ultraviolet difference spectrum gas sensor, the digital pressure sensor and the thermostatic controller are arranged in the working air chamber, the inlet for gas to be detected and the outlet for gas to be detected are respectively connected with a gas absorption cell of the ultraviolet difference spectrum gas sensor through pipelines, the ultraviolet difference spectrum gas sensor is used for detecting gas concentrations, the digital pressure sensor is used for measuring real-time pressure inside the working air chamber, and the thermostatic controller is used for keeping the temperature inside the closed box constant; the industrial control computer is mounted outside the closed box, and is connected with the driving motor, the ultraviolet difference spectrum gas sensor, the digital pressure sensor and the thermostatic controller, a gas concentration value detected by the ultraviolet difference spectrum gas sensor and a real-time pressure value detected by the digital pressure sensor are transmitted to the industrial control computer, the industrial control computer controls the driving motor to drive the regulating rod so as to drive the piston to move inside the closed box, and the industrial control computer controls the thermostatic controller to work.

Further, the ultraviolet difference spectrum gas sensor is an $H_2S$ gas sensor or a $NH_3$ gas sensor.

Further, two limiting partitions are provided, and are symmetrically fixed to the inner wall of the closed box.

Further, the regulating rod is hermetically connected to the closed box.

The present invention also provides an ambient pressure compensation method for an ultraviolet difference spectrum gas sensor, which is implemented by using the above ambient pressure compensation structure for an ultraviolet difference spectrum gas sensor, and comprises the following steps:

Step 1, adopting the above ambient pressure compensation structure for an ultraviolet difference spectrum gas sensor, introducing gas with different concentrations into the closed box, and measuring gas concentration values $C_b$ at different pressures $p_h$;

Step 2, establishing a formula model of the relationship between ratios k and air pressure difference parameters $\Delta p$ based on the ratios k of the gas concentration values of gas with different concentrations at different pressures $p_h$ before pressure compensation obtained in step 1 to a reference standard concentration value, and determining relevant parameters of the formula model by a linear fitting method, wherein a fitting formula is:

$$K = a + b^*x + c^*x^2 + d^*x^3 + e^*x^4 + f^*x^5 \qquad (2)$$

wherein in the formula, K is an air pressure compensation coefficient; a, b, c, d, e and f are fitting parameters respectively; x is the air pressure difference parameter $\Delta p$, kPa;

Step 3, calculating gas concentration values $C_a$ after air pressure compensation at different pressures $p_h$;

Step 4, establishing a model of a measured gas concentration error $\Delta V$ caused by change in ambient pressure; and Step 5, comparing the gas concentration error value $\Delta V$ with the maximum permissible error W of the gas concentration, if $\Delta V \le W$, completing the iteration; if $\Delta V > W$, calculating $C'_a$ by formula (5), $$C'_a = C_a/K \qquad (5)$$

calculating $\Delta V'$ by formula (6), $$\Delta V' = C'_a - C_0 \qquad (6)$$

re-judging the magnitude relationship between $\Delta V'$ and W, and completing the iteration until $\Delta V' \le W$, otherwise repeating calculations by formulas (5) and (6).

Further, the ambient pressure compensation method for an ultraviolet difference spectrum gas sensor specifically comprises the following steps:

Step 1, adopting the above ambient pressure compensation structure for an ultraviolet difference spectrum gas sensor, introducing gas with different concentrations into the ultraviolet difference spectrum gas sensor inside the closed box, and measuring gas concentration values $C_b$ at different pressures $P_h$, wherein the specific implementation steps comprise step 101 and step 102:

Step 101, controlling, by the industrial control computer, the thermostatic controller to work so that the internal temperature of the closed box reaches the ambient temperature t and is kept constant, wherein the thermostatic controller guarantees that the change in ambient temperature of the closed box is very small, so that the influence of the ambient temperature on the pressure can be neglected;

Step 102, sequentially introducing gas with different preset concentrations into the ultraviolet difference spectrum gas sensor from the inlet for gas to be detected of the closed box, and discharging the gas from the outlet for gas to be detected after the gas is detected by the ultraviolet difference spectrum gas sensor, wherein every time the gas is introduced, when the gas concentration value measured by the ultraviolet difference spectrum gas sensor reaches a stable gas concentration value, the gas is continuously input, the internal pressure of the working air chamber is changed to simulate the change of the ambient pressure, and when the internal pressure of the working air chamber reaches a preset pressure value, the gas concentration measured by the ultraviolet difference spectrum gas sensor reaches a stable value, and is transmitted to the industrial control computer for output, and finally gas concentration values $C_b$ of gas with different concentrations at different pressures $p_h$ before pressure compensation are obtained;

Step 2, establishing a formula model of the relationship between the gas concentrations and detection ambient air pressure based on the gas concentration values of gas with different concentrations at different pressures $p_h$ before pressure compensation obtained in step 1, and determining relevant parameters of the formula model by a linear fitting method, wherein the specific implementation steps comprise steps 201-203:

Step 201, defining an air pressure difference parameter $\Delta p$, the expression of which is:

$$\Delta p = p_h - p_0 \qquad (1)$$

wherein in the formula, $p_h$ is the air pressure value at different pressures, kPa; $p_0$ is the ambient pressure value when the ultraviolet difference spectrum gas sensor is calibrated, kPa;

Step 202, selecting a preset introduced-gas concentration value $C_0$ which is 50% of a full range of the ultraviolet difference spectrum gas sensor as a reference standard concentration value, calculating ratios k of gas concentration values $C_b$ measured by the ultraviolet difference spectrum gas sensor under air pressure difference parameters $\Delta p$ at different pressures $p_h$ to the reference standard concentration value at the reference standard concentration value, and then fitting a change relationship between the ratios k and the air pressure difference parameters $\Delta p$ using a fifth-order polynomial:

$$K = a + b^*x + c^*x^2 + d^*x^3 + e^*x^4 + f^*x^5 \qquad (2)$$

wherein in the formula, K is an air pressure compensation coefficient; a, b, c, d, e and f are fitting parameters respectively; x is the air pressure difference parameter $\Delta p$, kPa;

Step 203, substituting each $\Delta p$ obtained in formula (1) as x into formula (2), to obtain an air pressure compensation coefficient k' corresponding to each air pressure difference parameter $\Delta p$ after fitting;

Step 3, calculating gas concentration values $C_a$ after air pressure compensation at different pressures $p_h$ by formula (3), $$C_a = C_b/k' \qquad (3)$$

wherein in the formula, $C_b$ is the gas concentration value of gas with different concentrations at different pressures $p_h$ before pressure compensation, ppm; k' is the air pressure compensation coefficient value corresponding to each air pressure difference parameter $\Delta p$ after fitting;

Step 4, establishing a model of a measured gas concentration error caused by change in ambient pressure as follows:

$$\Delta V = C_a - C_0 \qquad (4)$$

wherein in formula (4), $\Delta V$ is the gas concentration error value, ppm; $C_0$ is the preset introduced-gas concentration value, ppm;

Step 5, comparing the gas concentration error value $\Delta V$ with the maximum permissible error W of the gas concentration, if $\Delta V \le W$, completing the iteration; if $\Delta V > W$, calculating $C'_a$ by formula (5), $$C'_a = C_a/K \qquad (5)$$

calculating $\Delta V'$ by formula (6), $$\Delta V' = C'_a - C_0 \qquad (6)$$

re-judging the magnitude relationship between $\Delta V'$ and W, and completing the iteration until $\Delta V' \le W$, otherwise repeating calculations by formulas (5) and (6).

Further, the temperature tin step 101 is 25° C.

Further, the pressures in step 102 are 80 kPa, 85 kPa, 90 kPa, 95 kPa, 100 kPa, 105 kPa, 110 kPa, 115 kPa and 120 kPa, respectively.

Further, the specific method of changing the internal pressure of the working air chamber in step 102 is as follows:

the industrial control computer is used to control the driving motor to drive the regulating rod so as to drive the piston to move inside the closed box, thereby changing internal volumes of the pressure regulating air chamber and the working air chamber, so that the pressure inside the working air chamber can obtain a predetermined pressure value; when the volume of the pressure regulating air chamber becomes smaller, the volume of the working air chamber becomes larger, so that the internal pressure of the working air chamber decreases; when the volume of the pressure regulating air chamber becomes larger, the volume of the working air chamber becomes smaller, so that the internal pressure of the working air chamber increases; the internal pressure of the working air chamber is displayed in real time by the digital pressure sensor, and is fed back to the industrial control computer.

Compared with the prior art, the beneficial effects of the present invention are as follows: the present invention simulates the change in external ambient pressure by changing the internal volume of a closed environment, thereby revealing the effect of the ambient pressure on the test accuracy of the sensor, establishes a formula model of the relationship between the gas concentrations and the detection ambient air pressure based on actually measured data of different gas concentrations obtained by a gas sensor at different pressures $p_h$, determines relevant parameters of the formula model by a linear fitting method so as to obtain an accurate mathematical relationship between the gas concentrations and the detection ambient air pressure, and applies the mathematical relationship to the post-processing of the actually measured data of the gas concentrations to reduce non-linear errors caused by the fluctuation in the detection ambient air pressure in the actual detection of the gas sensor. The compensation structure and method of the present invention can perform compensation on gas concentrations at different ambient pressures, overcome the defect that the measured gas concentration is inaccurate due to change in ambient pressure, and provide a theoretical basis for industrial ambient gas concentration measurement.

In the figures: 1—closed box; 2—ultraviolet difference spectrum gas sensor; 3—digital pressure sensor; 4—thermostatic controller; 5—industrial control computer; 6—pressure regulating air chamber; 71—piston; 72—regulating rod; 73—driving motor; 8—working air chamber; 9—inlet for gas to be detected; 10—outlet for gas to be detected; 11—limiting partition.

DETAILED DESCRIPTION

The technical solutions in the embodiments of the present invention will be clearly and completely described below in conjunction with the accompanying drawings in the embodiments of the present invention, it is obvious that the described embodiments are only a part of the embodiments of the present invention, rather than all of the embodiments. Based on the embodiments in the present invention, all other embodiments obtained by those of ordinary skill in the art without making inventive labor, belong to the scope of protection of the present invention.

Embodiment 1

Figure 1:
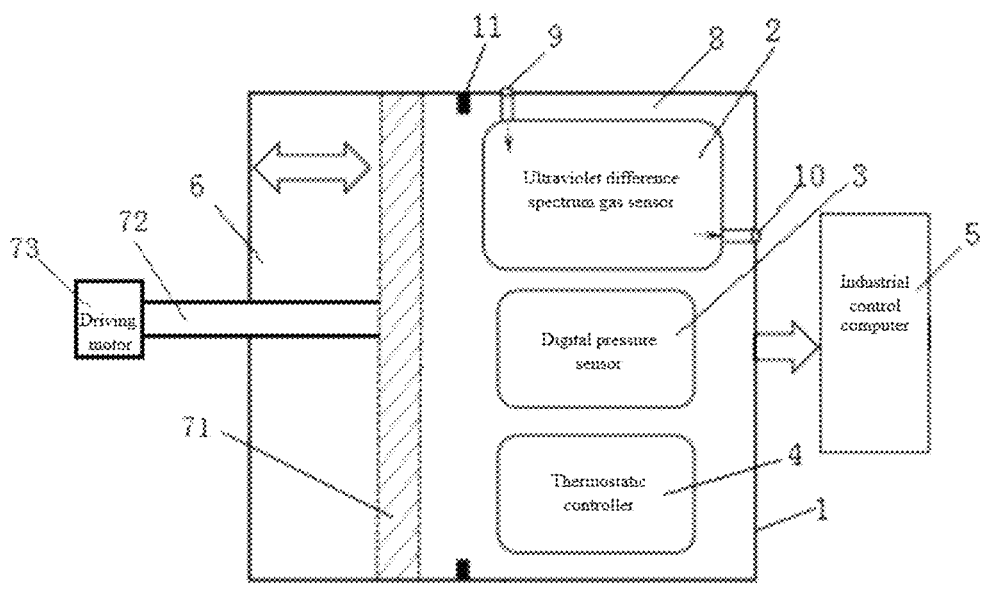
FIG. 1 is a schematic diagram of an ambient pressure compensation structure for an ultraviolet difference spectrum gas sensor of the present invention.

Referring to FIG. 1, an ambient pressure compensation structure for an ultraviolet difference spectrum gas sensor comprises a closed box 1, an ultraviolet difference spectrum gas sensor 2, a digital pressure sensor 3, a thermostatic controller 4, an industrial control computer 5, a pressure regulating assembly and a limiting partition 11; wherein the closed box 1 is of a cuboid structure, the pressure regulating assembly and the limiting partition 11 are arranged inside the closed box 1, the pressure regulating assembly comprises a piston 71, a regulating rod 72 and a driving motor 73, the left side of the piston 71 is connected with the regulating rod 72, the front end of the regulating rod 72 penetrates out of the closed box 1 and is connected with the driving motor 73, the piston 71 divides the interior of the closed box 1 into a pressure regulating air chamber 6 and a working air chamber 8, the piston 7 is hermetically and slidably connected with the inner wall surface of the closed box 1, and is arranged on the left side of the limiting partition 11, the limiting partition 11 is used for limiting the displacement of the piston 7, the upper side of the working air chamber 8 is provided with an inlet for gas to be detected 9, and the right end of the working air chamber 8 is provided with an outlet for gas to be detected 10;

the ultraviolet difference spectrum gas sensor 2, the digital pressure sensor 3 and the thermostatic controller 4 are arranged inside the working air chamber 8, the inlet for gas to be detected 9 and the outlet for gas to be detected 10 are respectively connected to a gas absorption cell of the ultraviolet difference spectrum gas sensor 2 through pipelines, the ultraviolet difference spectrum gas sensor 2 is used for detecting the concentration of the gas, the digital pressure sensor 3 is used for measuring real-time pressure inside the working air chamber 8, the thermostatic controller 4 is used for keeping the temperature inside the closed box 1 constant; the industrial control computer 5 is mounted outside the closed box 1, and is connected with the driving motor 73, the ultraviolet difference spectrum gas sensor 2, the digital pressure sensor 3 and the thermostatic controller 4, a gas concentration value detected by the ultraviolet difference spectrum gas sensor 2 and a real-time pressure value detected by the digital pressure sensor 3 are transmitted to the industrial control computer 5, the industrial control computer 5 controls the driving motor 73 to drive the regulating rod 72 so as to drive the piston 71 to move inside the closed box 1, and the industrial control computer 5 controls the thermostatic controller 4 to work.

Two limiting partitions 11 are provided and are symmetrically fixed to the inner wall of the closed box 1.

The regulating rod 72 is hermetically connected to the closed box 1.

The ultraviolet difference spectrum gas sensor 2 is an $H_2S$ gas sensor.

Embodiment 2

The difference from Embodiment 1 is that the ultraviolet difference spectrum gas sensor 2 is a $NH_3$ gas sensor.

Embodiment 3

An ambient pressure compensation method for an ultraviolet difference spectrum gas sensor is implemented by using the ambient pressure compensation structure for an ultraviolet difference spectrum gas sensor in Embodiment 1, and comprises the following steps:

Step 1, adopting the above ambient pressure compensation structure for an ultraviolet difference spectrum gas sensor, introducing $H_2S$ gas with different concentrations into the closed box 1, and measuring gas concentrations at different pressures (pressures $P_h$ being 80 kPa, 85 kPa, 90 kPa, 95 kPa, 100 kPa, 105 kPa, 110 kPa, 115 kPa and 120 kPa, respectively):

Step 101, controlling, by the industrial control computer 5, the thermostatic controller 4 to work so that the internal temperature of the closed box 1 reaches the ambient temperature t and is kept constant, wherein the temperature t is set at 25° C., and the thermostatic controller 4 guarantees that the change in the ambient temperature of the closed box 1 is very small, so that the influence of the ambient temperature on the pressure can be neglected;

Step 102, sequentially introducing $H_2S$ gas with different preset concentrations into the ultraviolet difference spectrum gas sensor 2 from the inlet for gas to be detected 9 of the closed box 1 (in this embodiment, the range of the $H_2S$ gas sensor is 1000 ppm, so that preset gas concentration values $C_0$ of the introduced $H_2S$ gas are 0 ppm, 250 ppm, 375 ppm, 500 ppm, 625 ppm, 750 ppm and 1000 ppm, respectively), and discharging the gas from the outlet for gas to be detected 10 after the gas is detected by the ultraviolet difference spectrum gas sensor 2, wherein every time the gas is introduced, when the gas concentration value measured by the ultraviolet difference spectrum gas sensor 2 reaches a stable value, the gas is continuously input, the internal pressure of the working air chamber 8 is changed to simulate the change of the ambient pressure, and when the internal pressure of the working air chamber 8 reaches a preset pressure value, the gas concentration measured by the ultraviolet difference spectrum gas sensor 2 reaches a stable value, and is transmitted to the industrial control computer 5 for output, and finally gas concentration values $C_b$ of gas with different concentrations at different pressures $p_h$ before pressure compensation are obtained, as shown in Table 1; the specific method of changing the internal pressure of the working air chamber 8 in step 102 is as follows:

the industrial control computer 5 is used to control the driving motor 73 to drive the regulating rod 72 so as to drive the piston 71 to move inside the closed box 1, thereby changing internal volumes of the pressure regulating air chamber 6 and the working air chamber 8, so that the pressure inside the working air chamber 8 can obtain a predetermined pressure value, and the pressure of the external environment can be simulated; when the volume of the pressure regulating air chamber 6 becomes smaller, the volume of the working air chamber 8 becomes larger, so that the internal pressure of the working air chamber 8 decreases; when the volume of the pressure regulating air chamber 6 becomes larger, the volume of the working air chamber 8 becomes smaller, so that the internal pressure of the working air chamber 8 increases; the internal pressure of the working air chamber 8 is displayed in real time by the digital pressure sensor 3, and is fed back to the system program of the industrial control computer 5;

TABLE 1

| Gas concentration values $C_b$ measured by $H_2S$ gas sensor, into which $H_2S$ gas with preset gas concentration values $C_0$ is introduced, at different pressures $P_h$ | | | | | | | |
|---|---|---|---|---|---|---|---|
| | $C_0$/ppm | | | | | | |
| | 0 | 250 | 375 | 500 | 625 | 750 | 1000 |
| $p_h$/kPa | $C_b$/ppm | | | | | | |
| 80 | 5.45 | 320.76 | 484.61 | 640.53 | 813.29 | 961.78 | 1299.87 |
| 85 | 4.08 | 312.91 | 472.18 | 620.73 | 787.14 | 946.41 | 1274.13 |
| 90 | 3.27 | 264.63 | 403.25 | 535.32 | 673.47 | 799.95 | 1067.37 |
| 95 | 2.18 | 231.74 | 350.22 | 465.66 | 585.88 | 694.78 | 930.88 |
| 100 | 1.63 | 278.24 | 409.46 | 550.49 | 676.81 | 787.89 | 1084.10 |
| 105 | 2.72 | 289.67 | 437.78 | 582.07 | 732.35 | 868.48 | 1163.60 |
| 110 | 3.81 | 308.73 | 470.45 | 624.54 | 785.71 | 933.27 | 1245.27 |
| 115 | 4.36 | 333.78 | 503.66 | 662.11 | 839.62 | 1009.50 | 1359.07 |
| 120 | 5.99 | 352.84 | 533.07 | 704.58 | 894.61 | 1057.96 | 1429.86 |

Step 2, establishing a formula model of the relationship between ratios k and detection ambient air pressure difference parameters Δp based on the ratios k of the gas concentration values of gas with different concentrations at different pressures $p_h$ before pressure compensation obtained in step 1 to a reference standard concentration value, determining relevant parameters of the formula model by a linear fitting method so as to obtain an accurate mathematical relationship between the ratios k and the air pressure difference parameters Δp, and applying the mathematical relationship to the post-processing of actually measured data of the gas concentrations to reduce non-linear errors caused by the fluctuation of the detection ambient air pressure in the actual detection of the gas sensor, specifically comprising the following steps:

Step 201, defining an air pressure difference parameter Δp, the expression of which is:

$$\Delta p = p_h - p_0 \qquad (1)$$

wherein in the formula, $p_h$ is the air pressure value at different pressures, kPa; $p_0$ is the ambient pressure value when the ultraviolet difference spectrum gas sensor is calibrated, kPa, and in this embodiment, $p_0$=100 kPa;

Step 202, selecting a preset introduced-gas concentration value $C_0$ which is 50% of the full range of the ultraviolet difference spectrum gas sensor as a reference standard concentration value, calculating ratios k of the gas concentration values $C_b$ measured by the ultraviolet difference spectrum gas sensor 2 under air pressure difference parameters Δp at different pressures $p_h$ to the reference standard concentration value at the reference standard concentration value, and then fitting a change relationship between the ratios k and the air pressure difference parameters Δp using a fifth-order polynomial; wherein in this embodiment, $C_0$=500 ppm is selected as the reference standard concentration value, and the ratios k of gas concentration values $C_b$ measured by the ultraviolet difference spectrum gas sensor 2 under air pressure difference parameters Δp at different pressures $p_h$ to the reference standard concentration value $C_0$=500 ppm at the reference standard concentration value are calculated, and the air pressure difference parameters Δp and the ratio k are shown in Table 2;

TABLE 2

Figure 2:
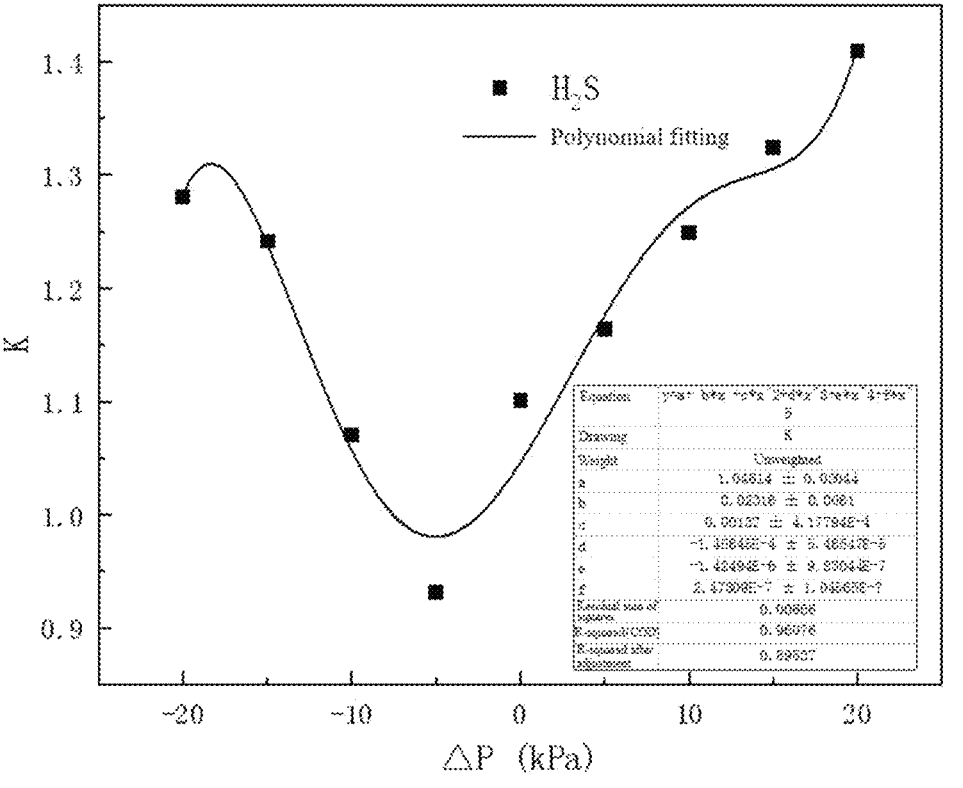
FIG. 2 is a schematic diagram of a fifth-order polynomial fitting curve for K values of $H_2S$ in Embodiment 3 of the present invention.

| Air pressure difference parameters $\Delta p$ and ratios k when $C_0$ = 500 ppm | | | | | | | | | |
|---|---|---|---|---|---|---|---|---|---|
| $\Delta p$/kPa | −20 | −15 | −10 | −5 | 0 | 5 | 10 | 15 | 20 |
| k | 1.28 | 1.24 | 1.07 | 0.93 | 1.1 | 1.16 | 1.25 | 1.32 | 1.41 | compared with the lower-order polynomial fitting, a fifth-order polynomial has a higher degree of linear fitting, and compared with the higher-order linear fitting, although the fitting degree can be further improved, the improvement is not obvious, and more parameters will be introduced, so the fifth-order polynomial fitting is selected. This polynomial is denoted by the letter K. The data in Table 2 are subjected to polynomial fitting, and after repeated tests, the fifth-order polynomial with the highest fitting degree is selected, and the fitting degree is as high as 0.89537. The fitting formula is:

$$K=a+b^*x+c^*x^2+d^*x^3+e^*x^4+f^*x^5 \qquad (2)$$

wherein in the formula, K is an air pressure compensation coefficient; a, b, c, d, e and f are fitting parameters respectively, x is the air pressure difference parameter $\Delta p$, kPa; refer to FIG. 2 for a fitting curve in this embodiment, wherein a=1.04614, b=0.02316, c=0.00132, d=−0.000148645; e=−0.00000142494, f=0.000000247309;

Step 203, substituting each $\Delta p$ obtained in formula (1) as x into formula (2), to obtain an air pressure compensation coefficient k' corresponding to each air pressure difference parameter $\Delta p$ after fitting, as shown in Table 3;

TABLE 3

| Air pressure compensation coefficient values k' corresponding to air pressure difference parameters $\Delta p$ after fitting | | | | | | | | | |
|---|---|---|---|---|---|---|---|---|---|
| $\Delta p$/kPa | −20 | −15 | −10 | −5 | 0 | 5 | 10 | 15 | 20 |
| k' | 1.281 | 1.237 | 1.056 | 0.98 | 1.046 | 1.176 | 1.272 | 1.305 | 1.412 |

Step 3, calculating gas concentration values $C_a$ after air pressure compensation at different pressures $p_h$ by formula (3), as shown in Table 4;

$$C_a=C_b/k' \qquad (3)$$

wherein $C_b$ is the gas concentration value of gas with different concentrations at different pressures $p_h$ before pressure compensation in Table 1, ppm; k' is the air pressure compensation coefficient value corresponding to each air pressure difference parameter $\Delta p$ after fitting;

TABLE 4

| Gas concentration values $C_a$ after air pressure compensation at different pressures $p_h$ | | | | | | | |
|---|---|---|---|---|---|---|---|
| | $C_0$/ppm | | | | | | |
| | 0 | 250 | 375 | 500 | 625 | 750 | 1000 |
| $p_h$/kPa | $C_a$/ppm | | | | | | |
| 80 | 4.25 | 250.46 | 378.38 | 500.13 | 635.02 | 750.97 | 1014.95 |
| 85 | 3.30 | 252.86 | 381.57 | 501.61 | 636.08 | 764.79 | 1029.62 |
| 90 | 3.09 | 250.55 | 381.79 | 506.83 | 637.63 | 757.38 | 1010.57 |
| 95 | 2.22 | 236.41 | 357.28 | 475.03 | 597.68 | 708.78 | 949.63 |
| 100 | 1.56 | 265.97 | 391.40 | 526.21 | 646.96 | 753.14 | 1036.29 |

TABLE 4-continued

| Gas concentration values $C_a$ after air pressure compensation at different pressures $p_h$ | | | | | | | |
|---|---|---|---|---|---|---|---|
| | $C_0$/ppm | | | | | | |
| | 0 | 250 | 375 | 500 | 625 | 750 | 1000 |
| $p_h$/kPa | $C_a$/ppm | | | | | | |
| 105 | 2.31 | 246.27 | 372.18 | 494.86 | 622.62 | 738.35 | 989.25 |
| 110 | 3.00 | 242.79 | 369.97 | 491.16 | 617.91 | 733.95 | 979.31 |
| 115 | 3.34 | 255.86 | 386.09 | 507.55 | 643.62 | 773.85 | 1041.81 |
| 120 | 4.24 | 249.96 | 377.64 | 499.15 | 633.77 | 749.49 | 1012.95 |

Step 4, establishing a model of a measured gas concentration error $\Delta V$ caused by change in ambient pressure as follows:

$$\Delta V=C_a-C_0 \qquad (4)$$

wherein in formula (4), $\Delta V$ is the gas concentration error value, ppm; $C_0$ is the preset introduced-gas concentration value, ppm;

Step 5, comparing the gas concentration error value with the maximum permissible error W of the gas concentration, if $\Delta V \leq W$, completing the iteration; if $\Delta V > W$, calculating $C'_a$ by formula (5), $$C'_a=C_a/K \qquad (5)$$

calculating $\Delta V'$ by formula (6), $$\Delta V'=C'_a-C_0 \qquad (6)$$

re-judging the magnitude relationship between $\Delta V'$ and W, and completing the iteration until $\Delta V' \leq W$, otherwise repeating calculations by formulas (5) and (6).

Since the ambient pressure has positive deviation and negative deviation, $\Delta V$ has a positive value and a negative value, if it is found that the deviation becomes large during the iterative calculation process, it is necessary to terminate the iteration, fine-tune the calibration benchmark and perform compensation again until the basic requirement is met.

Embodiment 4

An ambient pressure compensation method for an ultraviolet difference spectrum gas sensor is implemented by the ambient pressure compensation structure for an ultraviolet difference spectrum gas sensor in Embodiment 2, and comprises the following steps:

Step 1, adopting the above ambient pressure compensation structure for an ultraviolet difference spectrum gas sensor, introducing NH$_3$ gas with different concentrations into the ultraviolet difference spectrum gas sensor 2 inside the closed box 1, and measuring gas concentrations at different pressures $p_h$ (pressures $p_h$ being 80 kPa, 85 kPa, 90 kPa, 95 kPa, 100 kPa, 105 kPa, 110 kPa, 115 kPa and 120 kPa, respectively):

Step 101, controlling, by the industrial control computer 5, the thermostatic controller 4 to work so that the internal temperature of the closed box 1 reaches the ambient temperature t and is kept constant, wherein the temperature t is set at 25° C., and the thermostatic controller 4 guarantees that the change in the ambient temperature of the closed box 1 is very small, so that the influence of the ambient temperature on the pressure can be neglected;

Step 102, sequentially introducing NH$_3$ gas with different preset concentrations into the ultraviolet difference spectrum gas sensor 2 from the inlet for gas to be detected 9 of the closed box 1 (in this embodiment, the range of the NH₃ gas sensor is 50 ppm, so that preset gas concentration values $C_0$ of the introduced NH₃ gas are 0 ppm, 12.5 ppm, 18.75 ppm, 25 ppm, 31.25 ppm, 37.5 ppm and 50 ppm, respectively), and discharging the gas from the outlet for gas to be detected 10 after the gas is detected by the ultraviolet difference spectrum gas sensor 2, wherein every time the gas is introduced, when the gas concentration value measured by the ultraviolet difference spectrum gas sensor 2 reaches a stable value, the gas is continuously input, the internal pressure of the working air chamber 8 is changed to simulate the change of the ambient pressure, and when the internal pressure of the working air chamber 8 reaches a preset pressure value, the gas concentration measured by the ultraviolet difference spectrum gas sensor 2 reaches a stable value, and is transmitted to the industrial control computer 5 for output, and finally gas concentration values $C_b$ of gas with different concentrations at different pressures $p_h$ before pressure compensation are obtained, as shown in Table 5; the specific method of changing the internal pressure of the working air chamber 8 in step 102 is: the industrial control computer 5 is used to control the driving motor 73 to drive the regulating rod 72 so as to drive the piston 71 to move inside the closed box 1, thereby changing internal volumes of the pressure regulating air chamber 6 and the working air chamber 8, so that the pressure inside the working air chamber 8 can obtain a predetermined pressure value, and the pressure of the external environment can be simulated; when the volume of the pressure regulating air chamber 6 becomes smaller, the volume of the working air chamber 8 becomes larger, so that the internal pressure of the working air chamber 8 decreases; when the volume of the pressure regulating air chamber 6 becomes larger, the volume of the working air chamber 8 becomes smaller, so that the internal pressure of the working air chamber 8 increases; the internal pressure of the working air chamber 8 is displayed in real time by the digital pressure sensor 3, and is fed back to the system program of the industrial control computer 5.

TABLE 5

Gas concentration values $C_b$ measured by NH₃ gas sensor, into which NH₃ gas with preset gas concentration values $C_0$ is introduced, at different pressures $P_h$

| | $C_0$/ppm | | | | | | |
| | 0 | 12.5 | 18.75 | 25 | 31.25 | 37.5 | 50 |
| $p_h$/kPa | | | | $C_b$/ppm | | | |
| 80 | 0.24 | 13.89 | 20.98 | 27.73 | 35.21 | 41.64 | 56.27 |
| 85 | 0.18 | 13.55 | 20.44 | 26.87 | 34.08 | 40.97 | 55.16 |
| 90 | 0.14 | 11.46 | 17.46 | 23.17 | 29.15 | 34.63 | 46.21 |
| 95 | 0.09 | 10.03 | 15.16 | 20.16 | 25.36 | 30.08 | 40.30 |
| 100 | 0.07 | 12.05 | 17.73 | 23.83 | 29.30 | 34.11 | 46.93 |
| 105 | 0.12 | 12.54 | 18.95 | 25.20 | 31.70 | 37.60 | 50.37 |
| 110 | 0.17 | 13.37 | 20.37 | 27.04 | 34.01 | 40.40 | 53.91 |
| 115 | 0.19 | 14.45 | 21.80 | 28.66 | 36.35 | 43.70 | 58.83 |
| 120 | 0.26 | 15.27 | 23.08 | 30.50 | 38.73 | 45.80 | 61.90 |

Step 2, establishing a formula model of the relationship between ratios k of gas concentration values $C_b$ measured at different pressures $p_h$ to a reference standard concentration value and detection ambient air pressure difference parameters Δp based on the gas concentration values of gas with different concentrations at different pressures $p_h$ before pressure compensation obtained in step 1, determining relevant parameters of the formula model by a linear fitting method so as to obtain an accurate mathematical relationship between the ratios k and the air pressure difference parameters Δp, and applying the mathematical relationship to the post-processing of actually measured data of the gas concentrations to reduce non-linear errors caused by the fluctuation of the detection ambient air pressure in the actual detection of the gas sensor, specifically comprising the following steps:

Step 201, defining an air pressure difference parameter Δp, the expression of which is:

$$\Delta p = p_h - p_0 \tag{1}$$

wherein in the formula, $p_h$ is the air pressure value at different pressures, kPa; $p_0$ is the ambient pressure value when the ultraviolet difference spectrum gas sensor is calibrated, kPa, and in this embodiment, $p_0 = 100$ kPa;

Step 202, selecting a preset introduced-gas concentration value $C_0$ which is 50% of the full range of the ultra-violet difference spectrum gas sensor 2 as a reference standard concentration value, calculating ratios k of the gas concentration values $C_b$ measured by the ultraviolet difference spectrum gas sensor 2 under air pressure difference parameters Δp at different pressures $p_h$ to the reference standard concentration value at the reference standard concentration value, and then fitting a change relationship between the ratios k and the air pressure difference parameters Δp using a fifth-order polynomial; wherein in this embodiment, $C_0 = 25$ ppm is selected as the reference standard concentration value, and the ratios k of the gas concentration values $C_b$ measured by the ultraviolet difference spectrum gas sensor 2 under air pressure difference parameters Δp at different pressures $p_h$ to the reference standard concentration value $C_0 = 25$ ppm at the reference standard concentration value are calculated, and the air pressure difference parameters Δp and the ratio k are shown in Table 6;

TABLE 6

Air pressure difference parameters Δp and ratios k when $C_0 = 25$ ppm

Figure 3:
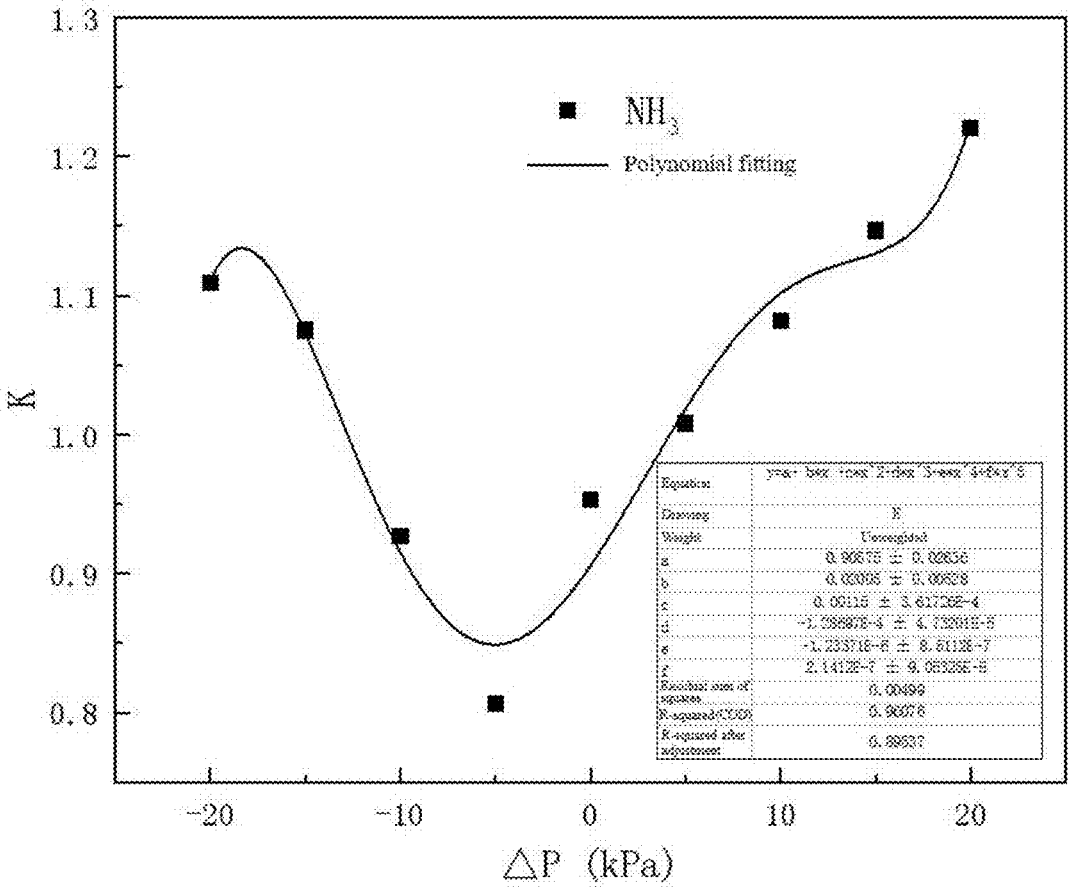
FIG. 3 is a schematic diagram of a fifth-order polynomial fitting curve for K values of $NH_3$ in Embodiment 4 of the present invention.

| Δp/kPa | −20 | −15 | −10 | −5 | 0 | 5 | 10 | 15 | 20 |
|---|---|---|---|---|---|---|---|---|---|
| k | 1.11 | 1.07 | 0.93 | 0.81 | 0.95 | 1.01 | 1.08 | 1.15 | 1.22 | compared with the lower-order polynomial fitting, a fifth-order polynomial has a higher degree of linear fitting, and compared with the higher-order linear fitting, although the fitting degree can be further improved, the improvement is not obvious, and more parameters will be introduced, so the fifth-order polynomial fitting is selected. This polynomial is denoted by the letter K. The data in Table 6 are subjected to polynomial fitting, and after repeated tests, the fifth-order polynomial with the highest fitting degree is selected, and the fitting degree is as high as 0.89537. The fitting formula is:

$$K = a + b*x + c*x^2 + d*x^3 + e*x^4 + f*x^5 \tag{2}$$

referring to FIG. 3, wherein in the formula, K is the air pressure compensation coefficient; a, b, c, d, e and f are fitting parameters respectively, a=0.90575, b=0.02005, c=0.00115, d=−0.000128697; e=−0.00000123371, f=0.0000002142;

Step 203, substituting each Δp obtained in formula (1) as x into formula (2), to obtain an air pressure compensation coefficient k' corresponding to each air pressure difference parameter Δp after fitting, as shown in Table 7;

TABLE 7

Air pressure compensation coefficient values k' corresponding to air pressure difference parameters Δp after fitting

| Δp/kPa | −20 | −15 | −10 | −5 | 0 | 5 | 10 | 15 | 20 |
|---|---|---|---|---|---|---|---|---|---|
| k' | 1.112 | 1.073 | 0.915 | 0.849 | 0.906 | 1.019 | 1.102 | 1.131 | 1.225 |

Step 3, calculating gas concentration values $C_a$ after air pressure compensation at different pressures $p_h$ by formula (3), as shown in Table 8;

$$C_a = C_b/k' \qquad (3)$$

wherein in the formula, $C_b$ is the gas concentration value of gas with different concentrations at different pressures $p_h$ before pressure compensation in Table 5, ppm; k' is the air pressure compensation coefficient value corresponding to each air pressure difference parameter Δp after fitting;

TABLE 8

Gas concentration values $C_a$ after air pressure compensation at different pressures $p_h$

| | $C_0$/ppm | | | | | | |
|---|---|---|---|---|---|---|---|
| | 0 | 12.5 | 18.75 | 25 | 31.25 | 37.5 | 50 |
| $p_h$/kPa | | | | $C_a$/ppm | | | |
| 80 | 0.21 | 12.49 | 18.87 | 24.94 | 31.67 | 37.45 | 50.62 |
| 85 | 0.16 | 12.62 | 19.05 | 25.04 | 31.76 | 38.18 | 51.40 |
| 90 | 0.15 | 12.52 | 19.07 | 25.32 | 31.86 | 37.84 | 50.49 |
| 95 | 0.11 | 11.82 | 17.86 | 23.75 | 29.88 | 35.43 | 47.47 |
| 100 | 0.08 | 13.30 | 19.57 | 26.31 | 32.35 | 37.66 | 51.81 |
| 105 | 0.12 | 12.31 | 18.61 | 24.74 | 31.13 | 36.91 | 49.45 |
| 110 | 0.15 | 12.13 | 18.49 | 24.54 | 30.88 | 36.67 | 48.93 |
| 115 | 0.17 | 12.78 | 19.28 | 25.34 | 32.14 | 38.64 | 52.02 |
| 120 | 0.21 | 12.47 | 18.84 | 24.90 | 31.62 | 37.39 | 50.53 |

Step 4, establishing a model of a measured gas concentration error ΔV caused by change in ambient pressure as follows:

$$\Delta V = C_a - C_0 \qquad (4)$$

wherein in formula (4), ΔV is the gas concentration error value, ppm; $C_0$ is the preset introduced-gas concentration value, ppm;

Step 5, comparing the gas concentration error value with the maximum permissible error W of the gas concentration, if ΔV≤W, completing the iteration; if ΔV>W, calculating $C'_a$ by formula (5), $$C'_a = C_a/K \qquad (5)$$

calculating ΔV' by formula (6), $$\Delta V' = C'_a - C_0 \qquad (6)$$

re-judging the magnitude relationship between ΔV' and W, and completing the iteration until ΔV'≤W, otherwise repeating calculations by formulas (5) and (6).

Since the ambient pressure has positive deviation and negative deviation, ΔV has a positive value and a negative value, if it is found that the deviation becomes large during the iterative calculation process, it is necessary to terminate the iteration, fine-tune the calibration benchmark and perform compensation again until the basic requirement is met.

According to the present invention, concentration data actually measured by the ultraviolet difference spectrum gas sensor at different ambient pressures are obtained, the formula model of the relationship between ratios k of the gas concentration values measured at different pressures $p_h$ to a reference standard concentration value and the detection ambient air pressure difference parameters Δp is established, and the relevant parameters of the formula model are determined by a linear fitting method. At the same time, an ambient pressure when the ultraviolet difference spectrum gas sensor is calibrated (detection ambient air pressure) being 100 kPa, a gas concentration value $C_0$ being 50% of the full range are selected as a basis reference for air pressure compensation, the compensation on the gas concentrations at different ambient pressures is performed, and the deviation amount of the concentration value measured by the ultraviolet difference spectrum gas sensor caused by the change in ambient pressure is corrected, so that the measurement accuracy of the sensor converges towards the standard gas concentration value, thereby achieving the effect of pressure compensation. The pressure compensation of two ultraviolet difference spectrum gas sensors, namely the $H_2S$ gas sensor and the $NH_3$ gas sensor, are given in the embodiments of the present invention, and the same compensation can be applied to other gas sensors using the present invention, which will not be described in detail here.

Although the embodiments of the present invention have been shown and described, it will be understood by those skilled in the art that various changes, modifications, substitutions and variations may be made to these embodiments without departing from the principles and spirit of the present invention, the scope of which is defined by the appended claims and their equivalents.

The invention claimed is:

1. An ambient pressure compensation method for an ultraviolet difference spectrum gas sensor, being implemented with an ambient pressure compensation structure for the ultraviolet difference spectrum gas sensor, characterized by comprising a closed box, the ultraviolet difference spectrum gas sensor, a digital pressure sensor, a thermostatic controller, an industrial control computer, a pressure regulating assembly and a limiting partition; wherein the closed box is of a cuboid structure, the pressure regulating assembly and the limiting partition are arranged inside the closed box, the pressure regulating assembly comprises a piston, a regulating rod and a driving motor, a left side of the piston is connected with the regulating rod, a front end of the regulating rod penetrates out of the closed box and is connected with the driving motor, the piston divides an interior of the closed box into a pressure regulating air chamber and a working air chamber, the piston is hermetically and slidably connected with an inner wall surface of the closed box, and is arranged on a left side of the limiting partition, the limiting partition is used for limiting a displacement of the piston, an upper side of the working air chamber is provided with an inlet for gas to be detected, and a right end of the working air chamber is provided with an outlet for gas to be detected;

the ultraviolet difference spectrum gas sensor, the digital pressure sensor and the thermostatic controller are arranged in the working air chamber, the inlet for gas to be detected and the outlet for gas to be detected are respectively connected with a gas absorption cell of the ultraviolet difference spectrum gas sensor through pipelines, the ultraviolet difference spectrum gas sensor is used for detecting gas concentrations, the digital pressure sensor is used for measuring real-time pressure inside the working air chamber, and the thermostatic controller is used for keeping a temperature inside the closed box constant; the industrial control computer is mounted outside the closed box, and is connected with the driving motor, the ultraviolet difference spectrum gas sensor, the digital pressure sensor and the thermostatic controller, a gas concentration value detected by the ultraviolet difference spectrum gas sensor and a real-time pressure value detected by the digital pressure sensor are transmitted to the industrial control computer, the industrial control computer controls the driving motor to drive the regulating rod so as to drive the piston to move inside the closed box, and the industrial control computer controls the thermostatic controller to work;

the ambient pressure compensation method for the ultraviolet difference spectrum gas sensor comprises the following steps:

step 1, adopting the above ambient pressure compensation structure for the ultraviolet difference spectrum gas sensor, introducing gas with different concentrations into the closed box, and measuring gas concentration values $C_b$ at different pressures $p_h$;

step 2, establishing a formula model of the relationship between ratios k and air pressure difference parameters $\Delta p$ based on the ratios k of the gas concentration values of gas with different concentrations at different pressures $p_h$ before pressure compensation obtained in step 1 to a reference standard concentration value, and determining relevant parameters of the formula model by a linear fitting method, wherein a fitting formula is:

$$K = a + b*x + c*x^2 + d*x^3 + e*x^4 + f*x^5 \qquad (2)$$

wherein in the formula, K is an air pressure compensation coefficient; a, b, c, d, e and f are fitting parameters respectively; x is the air pressure difference parameter $\Delta p$, kPa;

step 3, calculating gas concentration values Ca after air pressure compensation at different pressures $p_h$;

step 4, establishing a model of a measured gas concentration error $\Delta V$ caused by change in ambient pressure; and step 5, comparing the measured gas concentration error value $\Delta V$ with a maximum permissible error W of the gas concentration, if $\Delta V \leq W$, completing the iteration; if $\Delta V > W$, calculating $C_a'$ by formula (5), $$C_a' = C_a/K \qquad (5)$$

calculating $\Delta V$ by formula (6), $$\Delta V = C_a' - C_0 \qquad (6)$$

re-judging the magnitude relationship between $\Delta V'$ and W, and completing the iteration until $\Delta V' \leq W$, otherwise repeating calculations by formulas (5) and (6).

2. The ambient pressure compensation method for the ultraviolet difference spectrum gas sensor according to claim 1, characterized by specifically comprising the following steps:

step 1, adopting the ambient pressure compensation structure for the ultraviolet difference spectrum gas sensor, introducing gas with different concentrations into the ultraviolet difference spectrum gas sensor inside the closed box, and measuring gas concentration values $C_b$ at different pressures $P_h$, wherein specific implementation steps comprise step 101 and step 102:

step 101, controlling, by the industrial control computer, the thermostatic controller to work so that an internal temperature of the closed box reaches an ambient temperature t and is kept constant, wherein the thermostatic controller guarantees that change in the ambient temperature of the closed box is very small, so that the influence of the ambient temperature on the pressure can be neglected; and step 102, sequentially introducing gas with different preset concentrations into the ultraviolet difference spectrum gas sensor from the inlet for gas to be detected of the closed box, and discharging the gas from the outlet for gas to be detected after the gas is detected by the ultraviolet difference spectrum gas sensor, wherein every time the gas is introduced, when the gas concentration value measured by the ultraviolet difference spectrum gas sensor reaches a stable gas concentration value, the gas is continuously input, an internal pressure of the working air chamber is changed to simulate the change in ambient pressure, and when the internal pressure of the working air chamber reaches a preset pressure value, the gas concentration measured by the ultraviolet difference spectrum gas sensor reaches a stable value, and is transmitted to the industrial control computer for output, and finally gas concentration values $C_b$ of gas with different concentrations at different pressures $p_h$ before pressure compensation are obtained;

step 2, establishing a formula model of the relationship between the gas concentrations and detection ambient air pressure based on the gas concentration values of gas with different concentrations at different pressures $p_h$ before pressure compensation obtained in step 1, and determining relevant parameters of the formula model by a linear fitting method, wherein the specific implementation steps comprise steps 201-203:

step 201, defining an air pressure difference parameter $\Delta p$, the expression of which is:

$$\Delta p = p_h - p_0 \qquad (1)$$

wherein in the formula, $p_h$ is the air pressure value at different pressures, kPa; $p_0$ is the ambient pressure value when the ultraviolet difference spectrum gas sensor is calibrated, kPa;

step 202, selecting a preset introduced-gas concentration value $C_0$ which is 50% of a full range of the ultraviolet difference spectrum gas sensor as a reference standard concentration value, calculating ratios k of gas concentration values $C_b$ measured by the ultraviolet difference spectrum gas sensor under air pressure difference parameters $\Delta p$ at different pressures $p_h$ to a reference standard concentration value at the reference standard concentration value, and then fitting a change relationship between the ratios k and the air pressure difference parameters $\Delta p$ using a fifth-order polynomial:

$$K = a + b*x + c*x^2 + d*x^3 + e*x^4 + f*x^5 \qquad (2)$$

wherein in the formula, K is an air pressure compensation coefficient; a, b, c, d, e and f are fitting parameters respectively; x is the air pressure difference parameter $\Delta p$, kPa; and step 203, substituting each $\Delta p$ obtained in formula (1) as x into formula (2), to obtain an air pressure compensation coefficient k' corresponding to each air pressure difference parameter $\Delta p$ after fitting;

step 3, calculating gas concentration values Ca after air pressure compensation at different pressures $p_h$ by formula (3), $$C_a = C_b / k' \tag{3}$$

wherein in the formula, $C_b$ is the gas concentration value of gas with different concentrations at different pressures $p_h$ before pressure compensation, ppm; k' is the air pressure compensation coefficient value corresponding to each air pressure difference parameter $\Delta p$ after fitting;

step 4, establishing a model of a measured gas concentration error caused by change in ambient pressure as follows:

$$\Delta V = C_a - C_0 \tag{4}$$

wherein in formula (4), $\Delta V$ is the gas concentration error value, ppm; $C_0$ is the preset introduced-gas concentration value, ppm; and step 5, comparing the gas concentration error value $\Delta V$ with the maximum permissible error W of the gas concentration, if $\Delta V \leq W$, completing the iteration; if $\Delta V > W$, calculating $C_a'$ by formula (5), $$C_a' = C_a / K \tag{5}$$

calculating $\Delta V$ by formula (6), $$\Delta V' = C_a' - C_0 \tag{6}$$

re-judging the magnitude relationship between $\Delta V'$ and W, and completing the iteration until $\Delta V' \leq W$, otherwise repeating calculations by formulas (5) and (6).

3. The ambient pressure compensation method for the ultraviolet difference spectrum gas sensor according to claim 2, characterized in that the ambient temperature t in step 101 is 25° C.

4. The ambient pressure compensation method for the ultraviolet difference spectrum gas sensor according to claim 2, characterized in that the pressures in step 102 are 80 kPa, 85 kPa, 90 kPa, 95 kPa, 100 kPa, 105 kPa, 110 kPa, 115 kPa and 120 kPa, respectively.

5. The ambient pressure compensation method for the ultraviolet difference spectrum gas sensor according to claim 2, characterized in that a specific method of changing the internal pressure of the working air chamber in step 102 is as follows:

the industrial control computer is used to control the driving motor to drive the regulating rod so as to drive the piston to move inside the closed box, thereby changing internal volumes of the pressure regulating air chamber and the working air chamber, so that the pressure inside the working air chamber can obtain a predetermined pressure value; when the volume of the pressure regulating air chamber becomes smaller, the volume of the working air chamber becomes larger, so that the internal pressure of the working air chamber decreases; when the volume of the pressure regulating air chamber becomes larger, the volume of the working air chamber becomes smaller, so that the internal pressure of the working air chamber increases; the internal pressure of the working air chamber is displayed in real time by the digital pressure sensor, and is fed back to the industrial control computer.

6. The ambient pressure compensation method for the ultraviolet difference spectrum gas sensor according to claim 1, characterized in that the ultraviolet difference spectrum gas sensor is an $H_2S$ gas sensor or a $NH_3$ gas sensor.

7. The ambient pressure compensation method for the ultraviolet difference spectrum gas sensor according to claim 1, characterized in that two limiting partitions are provided, and are symmetrically fixed to an inner wall of the closed box.

8. The ambient pressure compensation method for the ultraviolet difference spectrum gas sensor according to claim 1, characterized in that the regulating rod is hermetically connected to the closed box.

\* \* \* \* \*